(12) United States Patent
Rinck et al.

(10) Patent No.: US 7,987,579 B2
(45) Date of Patent: Aug. 2, 2011

(54) METHOD FOR MOUNTING PERMANENT MAGNETS THAT FORM MAGNETIC POLES ON THE ROTOR OF AN ELECTRIC MACHINE

(75) Inventors: Jürgen Rinck, Mandelbachtal (DE); Axel Herrmann, Saarbrücken (DE)

(73) Assignee: Vensys Energy AG, Neunkirchen (DE)

( * ) Notice: Subject to any disclaimer, the term of this patent is extended or adjusted under 35 U.S.C. 154(b) by 214 days.

(21) Appl. No.: 12/383,174

(22) Filed: Mar. 21, 2009

(65) Prior Publication Data

US 2010/0237734 A1  Sep. 23, 2010

(51) Int. Cl.
*H02K 15/00* (2006.01)
(52) U.S. Cl. ............ 29/596; 264/262; 156/294; 29/598
(58) Field of Classification Search ............ 29/596–598, 29/732–736; 156/294–295; 264/262, 272.2; 310/156.12, 43, 89
See application file for complete search history.

(56) References Cited

U.S. PATENT DOCUMENTS

| | | | | |
|---|---|---|---|---|
| 4,529,900 A | * | 7/1985 | Uzuka | 310/43 |
| 4,588,467 A | * | 5/1986 | Tani et al. | 156/294 |
| 5,402,025 A | * | 3/1995 | Saito et al. | 310/156.27 |
| 7,120,986 B2 | * | 10/2006 | Kojima et al. | 29/596 |
| 2002/0158532 A1 | | 10/2002 | Uemura et al. | |
| 2010/0237734 A1 | * | 9/2010 | Rinck et al. | 310/156.23 |

FOREIGN PATENT DOCUMENTS

| | | | |
|---|---|---|---|
| DE | 39 13 618 | 11/1989 | |
| DE | 10152722 | 11/2002 | |
| EP | 0 410 048 | 12/1993 | |
| EP | 1 473 816 | 11/2004 | |
| EP | 1536543 | 6/2005 | |
| FR | 2707813 | 1/1995 | |
| JP | 60200753 | * 10/1985 | 310/261 |

* cited by examiner

*Primary Examiner* — Minh Trinh
(74) *Attorney, Agent, or Firm* — Lucas & Mercanti, LLP; Klaus P. Stoffel

(57) ABSTRACT

A method for mounting permanent magnets that form magnetic poles on a permanent magnet support surface of the rotor of an electric machine includes the steps of forming a mold by the placement of a mold part against the support surface in such a way that the mold cavity of the mold is bounded on one side by the support surface inserting a permanent magnet into the mold so that the inserted permanent magnet is held in the mold in a desired position with respect to the support surface, and filling the mold with a thermosetting adhesive in such that the adhesive bonds the permanent magnet with the support surface and completely fills any spaces formed between the permanent magnet and the wall of the mold cavity.

12 Claims, 2 Drawing Sheets

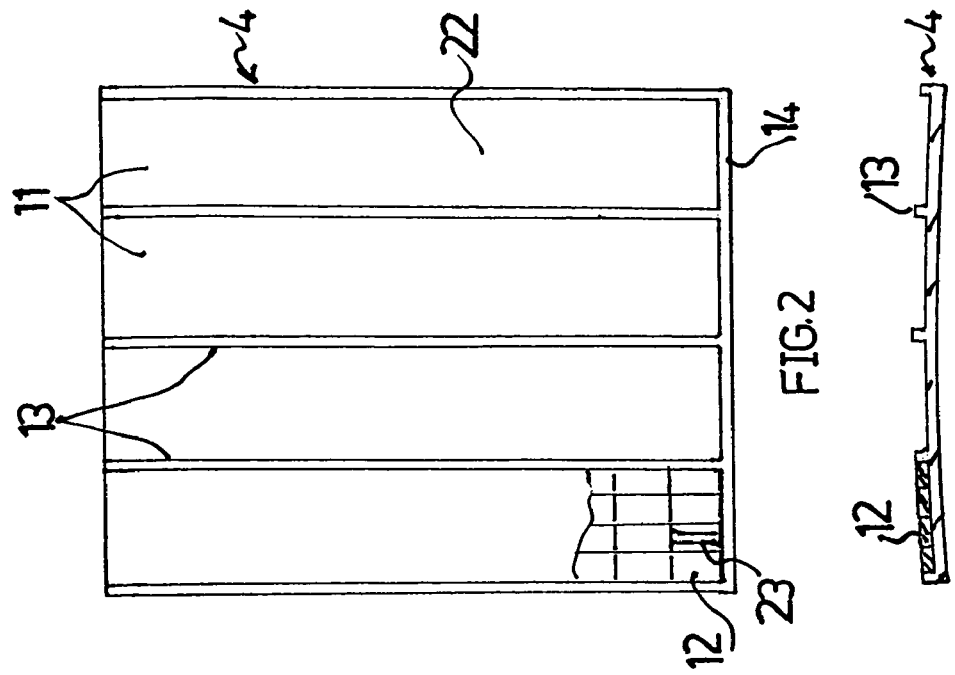
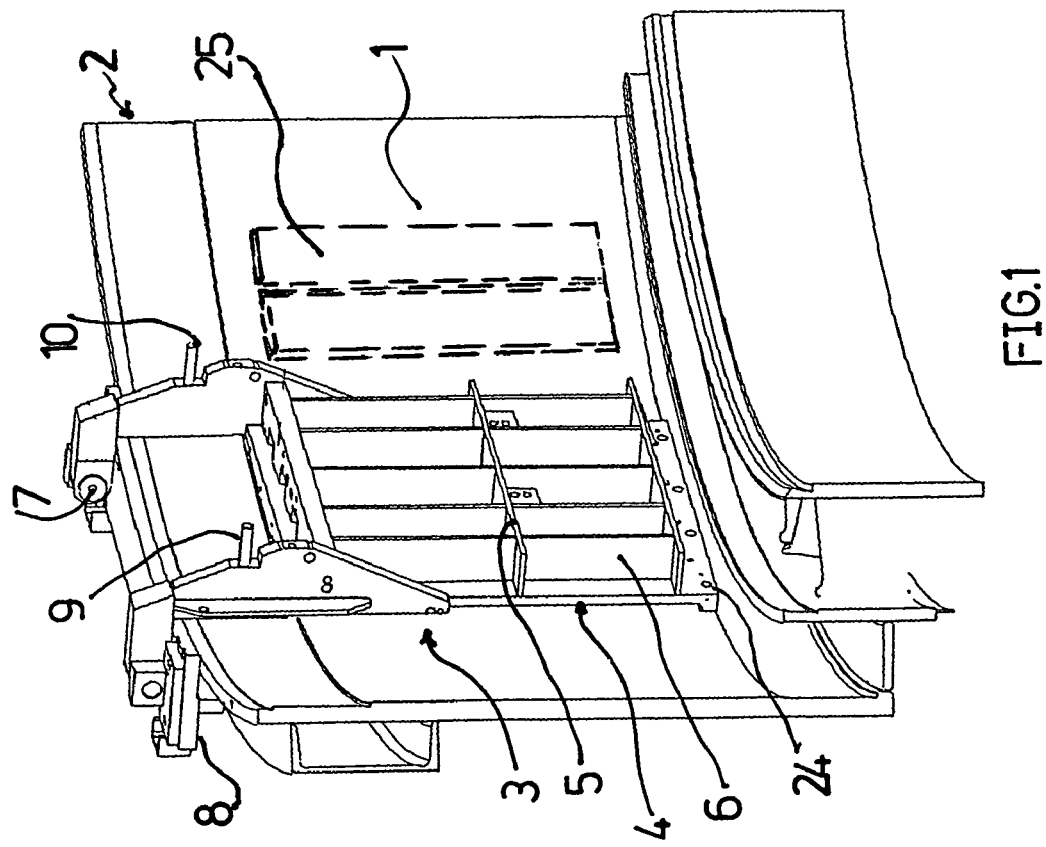

METHOD FOR MOUNTING PERMANENT MAGNETS THAT FORM MAGNETIC POLES ON THE ROTOR OF AN ELECTRIC MACHINE

BACKGROUND OF THE INVENTION

1. Field of the Invention

The present invention relates to a method for mounting permanent magnets that form magnetic poles on a permanent magnet support surface of the rotor of an electric machine.

2. Description of the Related Art

The positionally precise and secure mounting of permanent magnets on the rotor of permanently energized electric machines, especially their mounting by adhesive bonding, leads to difficulties. Due to the high forces of attraction between the permanent magnets and the rotor, the permanent magnets cannot be easily handled.

Methods for mounting permanent magnets on the rotor of electric machines are described, e.g., in DE 39 13 618 A1, EP 0 410 048 B1, and EP 1 473 816 A1.

SUMMARY OF THE INVENTION

The object of the present invention is to create a method that allows a positionally precise and secure joining of permanent magnets with the rotors of electric machines.

The invention achieves this object by forming a mold by placing a mold part against the support surface in such a way that the mold cavity of the mold is bounded on one side by the support surface; the insertion of a permanent magnet into the mold in such a way that the inserted permanent magnet is held in the mold in a desired position with respect to the support surface; and the filling of the mold with a thermosetting adhesive in such a way that the adhesive bonds the permanent magnet with the support surface and completely fills the spaces formed between the permanent magnet and the wall of the mold cavity.

The mold makes it possible to mount the permanent magnet precisely in the initial position necessary for carrying out the adhesive bonding process and to produce an extremely stable adhesive bond.

The permanent magnet can be mounted in the mold some distance from the wall of the mold cavity in such a way that almost the entire surface of the permanent magnet is covered with cured adhesive material, so that the permanent magnet is protected from corrosion. Accordingly, it is possible to use extremely strong high-energy magnets that are susceptible to corrosion.

It is advantageous for a mold that is open at the top to be filled from the bottom with adhesive under light pressure. The adhesive can then rise slowly with avoidance of the inclusion of air bubbles in the mold, and air can escape at the top.

The permanent magnet is preferably inserted from above into a mold that is open at the top. In a preferred embodiment of the invention, the permanent magnet consists of segments, which are put together to form the permanent magnet by inserting them into the mold. This has the advantage that the smaller segments can be produced and handled more easily than a complete one-piece magnet.

In an especially preferred embodiment of the invention, the mold part is produced from a soft magnetic material; and in this way the force of attraction that acts on the permanent magnet or the segments of the permanent magnet and is directed towards the support surface is reduced by magnetic back-circuit with the mold part. During the insertion of the permanent magnet or segments into the mold, only relatively small frictional forces arise from attraction of the permanent magnet or permanent magnet segments towards the support surface.

In a further refinement of the invention, several segments to be inserted into the mold can be positioned in an initial position for the insertion operation by arranging them on a guideway of an insertion device in such a way that they are offset from one another in the direction of insertion. This offset makes it possible to avoid the repulsive forces between the segments of the permanent magnet, which hinder their arrangement on the guideway.

Reference magnets can be arranged in the initial positions. They provide repulsion and thus prevent the arrangement of segments in incorrect polarity in the initial positions.

The mold part is preferably mounted on the rotor in such a way that it can swivel about a joint axis, so that it can be lifted from the support surface by swiveling to allow the cast magnetic pole to be removed from the mold.

In a further refinement of the invention, the permanent magnets or segments are inserted with a small, adjustable distance of the mold part from the support surface, the mold part is then placed against the support surface, and the mold cavity is sealed by a strand seal. The small distance from the support surface facilitates the insertion of the permanent magnet or segments into the mold cavity, which is still slightly opened, thereby offering more clearance.

Grooves can be placed in the permanent magnet and the support surface, in which adhesive and/or escaping air can flow. This facilitates the filling of the aforementioned gaps and spaces and shortens the filling process.

To accelerate the curing of the adhesive in the mold, the mold can be heated.

The thermosetting adhesive preferably forms a permanently elastic material.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

The invention is explained in greater detail below with reference to the specific embodiment illustrated in the accompanying drawings:

FIG. 1 is a perspective view of a section of a rotor ring of a synchronous machine, on which a device for mounting permanent magnets on the rotor ring is mounted.

FIG. 2 shows a mold part used in the mounting device of FIG. 1 in a direction of view towards the axis of rotation of the rotor ring.

FIG. 3 is a cross-sectional view of the mold part.

DETAILED DESCRIPTION OF THE INVENTION

Figure 5:
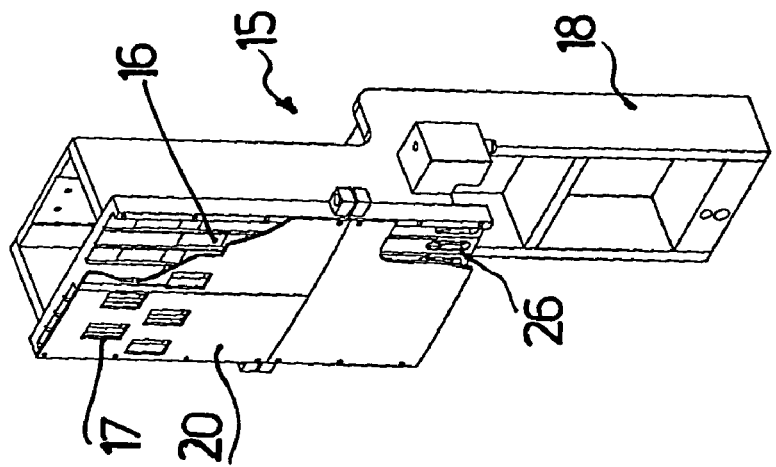
FIG. 5 shows the insertion device of FIG. 4 in an isolated view that is rotated 90° from the view of FIG. 4.

Permanent magnets 25 in the form of rectangular solids, which alternately form a magnetic north pole and a magnetic south pole, are to be mounted on a support surface 1 of a rotor ring 2 of a synchronous machine. FIG. 1 shows a section of the rotor ring. Mounting is accomplished with a device 3 by which altogether four such magnets can be simultaneously mounted on the support surface 1 at a predetermined tangential distance from each other.

The mounting device 3 comprises a mold part 4, which can be placed against the support surface 1. The side of the mold part that faces away from the support surface 1 is reinforced by ribs 5, 6. As will be explained later, the mold part 4 and the support surface 1 together form molds. The mold part is mounted on a mounting device 8, which is connected with the rotor ring 2, in such a way that it can be swiveled about an axis of rotation 7. The distance between the mold part 4 and the support surface 1 can be varied by setscrews 9, 10.

FIG. 2, which shows the side of the mold part 4 that faces the support surface 1, reveals four compartments 11 for the insertion of one permanent magnet 25 each. The permanent magnets 25 consist of magnet segments 12 arranged in thirteen rows and four columns, so that in the present embodiment, each permanent magnet 25 consists of fifty-two segments 12.

The compartments 11, which are open towards the support surface 1, are closed only at their undersides by a boundary wall 14. They are open at the top. The base 22 of each compartment 11 is furnished with a Teflon coating.

Figure 4:
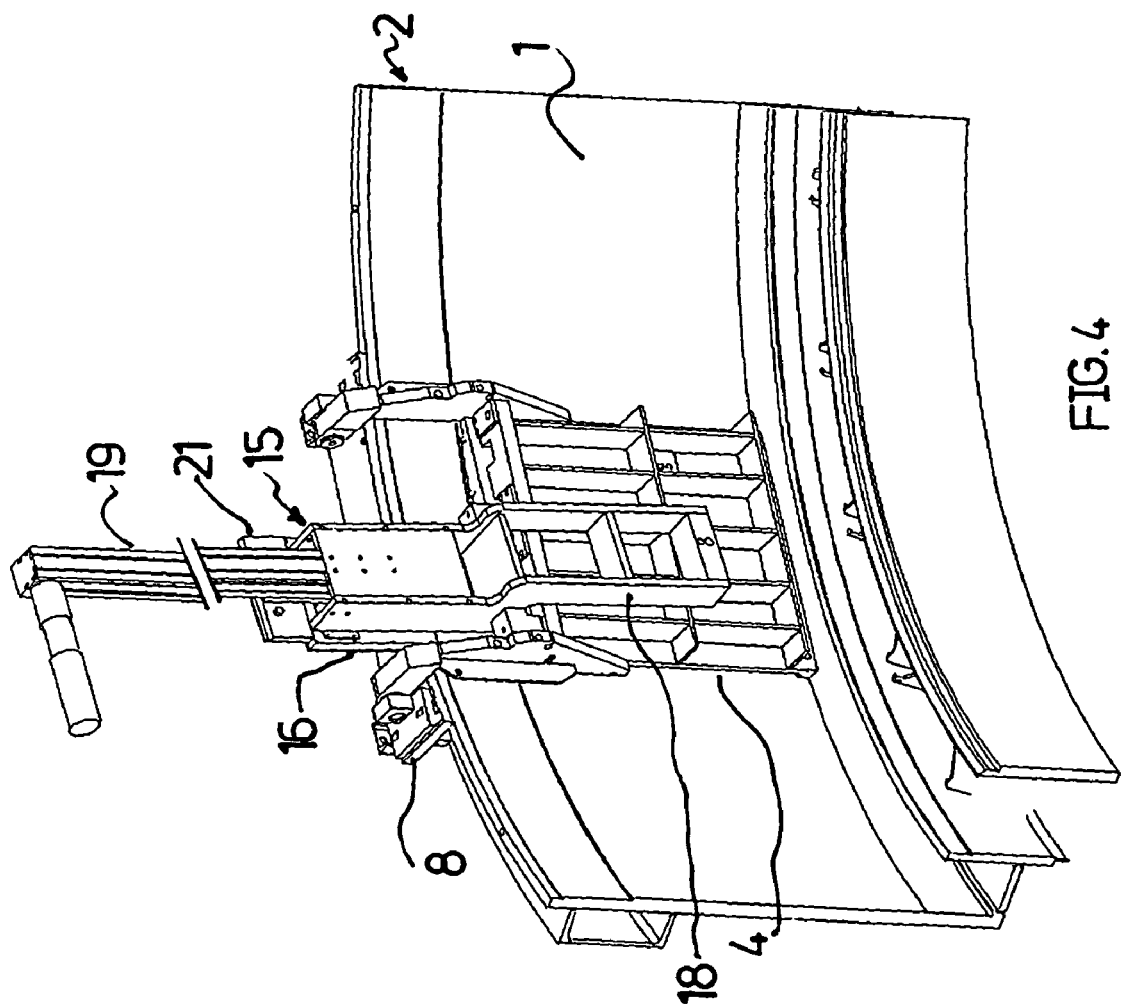
FIG. 4 is a perspective view of the device of FIG. 1 with an insertion device mounted on it.

In the arrangement of the mold part 4 shown in FIG. 4, segments 12 can be inserted by a motor-driven insertion device 15 into four chambers formed by the compartments 11 and the support surface 1. The insertion device 15 has a guideway 16 for eight segments. The segments can be arranged on the guideway 16 in an initial position for the insertion process through windows 17 in a cover 20, such that the initial positions are offset from one another in the direction of insertion, so that that arrangement of the segments in the initial position is not hindered by mutual repulsion.

A lower section 18 of the insertion device 15 serves to join the insertion device 3 with the mounting device. A motor-driven slide 19 moves the four segments 12 arranged in the initial position in the direction towards the mold part 4 by means of drivers 21. During this operation, the segments are held on the guideway 16 by the cover 20.

In the specific illustrated example here, all together 4992 segments are to be mounted on the circumference of the rotor ring 2, which form permanent magnets or poles composed of fifty-two segments each. For the simultaneous mounting of four permanent magnets, the mounting device 3 is mounted in the necessary position on the rotor ring 2 and brought into the swivel position shown in FIGS. 1 and 4. The setscrews 9, 10 are used to produce the desired distance between the mold part 4 and the support surface 1. In the desired spaced position produced in this way, the segments 12 are pushed into the compartments 11, whose open sides face the support surface 1. Eight segments at a time can be simultaneously inserted by the insertion device 15 into the chambers 11 formed by the compartments and the support wall 1. Reference magnets (not shown) on the rear side of the guideway 16 opposite the windows 17 ensure that the segments 12 can be arranged only in correct polarity in the initial position on the guideway 16.

The guideway 16, which comprises several individual tracks, consists of material that is not soft magnetic. Therefore, during the advancing of the segments 12 on the guideway; there are no frictional forces to be overcome due to attraction of the segments to the guideway. Stops 26 are formed at the transition to the compartments 11 or chambers and serve to align the segments 12 in a straight row to allow them to enter the chambers simultaneously. Alternatively or additionally, the alignment of the segments could be carried out by producing an end section of the guideway from soft magnetic material.

During the entrance of the segments into the compartments 11 or chambers intrinsically strong forces of attraction act in the direction towards the support surface 1. However, these forces of attraction are largely compensated by virtue of the fact that the mold part consists of a soft magnetic material, so that there is a magnetic back-circuit to the mold part 4. With suitable magnetizability of the material of the mold part, the force of attraction in the direction of the support surface could be completely overcome, and it would even be possible to produce a force of attraction in the direction of the mold part. The reduction of the force of attraction means that even when the segments are being inserted into the chambers, no large frictional forces arising from forces of attraction need to be overcome.

During the advancing of the first row of segments, the segments are stopped against the boundary wall 14. The following rows of four segments each are stopped against the segments that have previously been inserted.

After four permanent magnets have been assembled from segments by inserting segments into the chambers, the mold part 4 is lowered farther towards the support surface 1 by means of setscrews 9, 10, and elastomer seals seal the molds formed by the mold part 4 and the support wall. Two lateral edges of the rectangular solid segments 12 lie against the slightly rounded support surface 1, with a gap being formed between each segment and the support surface. In addition, gaps with a slightly conical shape are present between the lateral surfaces of the outer segments and the webs 13. The Teflon-coated base surfaces 22 of the compartments 11 are also separated by a small distance from the sides of the segments 12 that face away from the support surface 1.

A liquid adhesive is introduced under slight pressure through connectors 24 on the underside of the mold part 4. The adhesive slowly rises to the top in the aforementioned gaps and spaces. The ascent of the adhesive is assisted by longitudinal grooves in the segments 12, as indicated in FIG. 2. Air can also escape through the longitudinal grooves and exit at the top. Grooves 23 running transversely to the longitudinal grooves can be formed in the support surface 1. The filling with adhesive is ended when the adhesive level rises above the upper ends of the uppermost segments.

It is now necessary to wait for the adhesive to cure. The curing can be accelerated by heating the mold, especially the mold part 4.

After the curing is complete, the mold part 4 is swiveled about the axis of rotation 7 to release the four permanent magnets 25 from the mold. The permanent magnets are not merely adhesively bonded with the support surface 1 but rather are also almost completely embedded in the cured adhesive and protected from corrosion.

The release of the permanent magnets from the mold is made possible by the Teflon coating on the base 22 of the compartments 11 and by the application of parting agent to the sides of the webs 13 and the boundary wall 14. The Teflon coating ensures that the segments 12 can slide smoothly without any jerking motion into the mold during the insertion process.

To arrange the segments 12 in the initial position on the guideway 16, a hammer-like tool can be used, whose head consists of a soft magnetic material with a nonmagnetizable coating. The thickness of the coating can be selected in such a way that a desired force of attraction develops between the segment and the head of the hammer.

The magnetic poles adhesively bonded with the support surface 1 can be additionally secured against detachment by a band or other suitable cover.

While specific embodiments of the invention have been shown and described in detail to illustrate the inventive principles, it will be understood that the invention may be embodied otherwise without departing from such principles.

We claim:

1. A method for mounting permanent magnets forming magnetic poles on a support surface of the rotor of an electric machine, the method comprising:
    forming a mold by placing a mold part against the support surface such that the mold cavity of the mold is bounded on one side by the support surface;
    inserting a permanent magnet into the mold so that the inserted permanent magnet is held in the mold in a desired position with respect to the support surface; and
    filling the mold with a thermosetting adhesive such that the adhesive bonds the permanent magnet with the support surface and completely fills spaces existing between the permanent magnet and the wall of the mold cavity.

2. The method in accordance with claim 1, comprising filling the mold, which is open at the top, with adhesive from the bottom.

3. The method in accordance with claim 1, wherein the permanent magnet is inserted from above into the mold, which is open at the top.

4. The method in accordance with claim 3, wherein the permanent magnet is comprised of segments, which are put together to form the permanent magnet by inserting them into the mold.

5. The method in accordance with claim 1, comprising producing the mold part from a soft magnetic material, and thereby reducing by magnetic back-circuit with the mold part, the force of attraction that acts on the permanent magnet or the segments of the permanent magnet and is directed towards the support surface.

6. The method in accordance with claim 1, comprising pushing the permanent magnet or segments into the mold by a motor-driven insertion device.

7. The method in accordance with claim 6, comprising positional several segments to be inserted into the mold in an initial position for the insertion operation by arranging them on a guideway of the insertion device so as to be offset from one another in the direction of insertion.

8. The method in accordance with claim 6, comprising arrangement reference magnets in the initial positions to provide repulsion and thereby to prevent the arrangement of segments in incorrect polarity in the initial positions.

9. The method in accordance with claim 1, comprising mounting the mold part on the rotor so as to be swivelable about a joint axis and the mold part can be lifted from the support surface by swiveling to allow the cast permanent magnet to be removed from the mold.

10. The method in accordance with claim 1, comprising inserting the permanent magnets or segments with a small distance of the mold part from the support surface, placing the mold part against the support surface by operation of a distance adjustment device, and sealing the mold cavity by a strand seal.

11. The method in accordance with claim 1, comprising providing the permanent magnet or the support surface with grooves in which at least one of adhesive and escaping air can flow.

12. The method in accordance with claim 1, comprising heating the mold to accelerate the curing of the adhesive.

* * * * *